(12) United States Patent
Snyder (10) Patent No.: US 7,983,260 B2
(45) Date of Patent: Jul. 19, 2011

(54) TECHNIQUES FOR WATERMARKING AND DISTRIBUTING CONTENT

(75) Inventor: Alan Michael Snyder, Palo Alto, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 133 days.

(21) Appl. No.: 12/469,263

(22) Filed: May 20, 2009

(65) Prior Publication Data
US 2009/0228592 A1 Sep. 10, 2009

Related U.S. Application Data

(63) Continuation of application No. 11/211,037, filed on Aug. 23, 2005, now Pat. No. 7,570,641.

(51) Int. Cl.
*H04L 12/28* (2006.01)

(52) U.S. Cl. ........ 370/390; 370/250; 370/252; 370/235; 370/476

(58) Field of Classification Search ............ 370/250, 370/252, 390, 476, 235
See application file for complete search history.

(56) References Cited

U.S. PATENT DOCUMENTS

| | | |
|---|---|---|
| 5,848,155 A | 12/1998 | Cox |
| 5,915,027 A | 6/1999 | Cox et al. |
| 6,208,745 B1 | 3/2001 | Florencio et al. |
| 6,389,403 B1 | 5/2002 | Dorak, Jr. et al. |
| 6,557,105 B1 * | 4/2003 | Tardo et al. ............ 713/193 |
| 6,996,249 B2 | 2/2006 | Miller et al. |
| 7,058,809 B2 * | 6/2006 | White et al. ............ 713/176 |
| 7,350,228 B2 * | 3/2008 | Peled et al. ............ 726/6 |
| 7,536,563 B2 * | 5/2009 | Fransdonk ............ 713/193 |
| 7,779,261 B2 * | 8/2010 | Moskowitz et al. .......... 713/176 |
| 7,827,109 B2 * | 11/2010 | Saito ............ 705/51 |
| 2001/0025341 A1 * | 9/2001 | Marshall ............ 713/176 |
| 2002/0003880 A1 | 1/2002 | Kato et al. |
| 2002/0078178 A1 | 6/2002 | Senoh |
| 2002/0168082 A1 * | 11/2002 | Razdan ............ 382/100 |
| 2003/0009669 A1 | 1/2003 | White et al. |
| 2003/0031318 A1 | 2/2003 | Troyansky et al. |
| 2005/0039020 A1 | 2/2005 | Levy |
| 2006/0126891 A1 * | 6/2006 | Seroussi et al. ............ 382/100 |

FOREIGN PATENT DOCUMENTS

JP 2001202452 7/2001
(Continued)

OTHER PUBLICATIONS

"U.S. Appl. No. 11/211,037, Response filed Feb. 23, 2009 to Non-Final Office Action mailed Jan. 21, 2009", 8 pgs.
(Continued)

*Primary Examiner* — Ricky Ngo
*Assistant Examiner* — Dewanda Samuel
(74) *Attorney, Agent, or Firm* — Schwegman, Lundberg & Woessner, P.A.

(57) ABSTRACT

Techniques for watermarking and distributing are provided. Content is broken into frames, each frame includes a watermark. Resources request the content and each frame of each resource's acquired version of the content includes a watermark. The frames of each resource's acquired version of the content form unique watermark sequences or unique keys. Each watermark sequence or key is uniquely associated with a particular resource. Each resource is also provided one or more delivery plans for acquiring that resource's uniquely watermark and sequenced version of the content over the network.

17 Claims, 6 Drawing Sheets

FOREIGN PATENT DOCUMENTS

| | | |
|---|---|---|
| JP | 2003337716 | 11/2003 |
| JP | 2004521570 | 7/2004 |
| WO | WO-03001813 A1 | 1/2003 |
| WO | WO-2007024994 A2 | 3/2007 |
| WO | WO-2007024994 A3 | 3/2007 |

OTHER PUBLICATIONS

"U.S. Appl. No. 11/211,037, Non-Final Office Action mailed Jan. 21, 2009", 17 pgs.

"U.S. Appl. No. 11/211,037, Non-Final Office Action mailed Aug. 5, 2008", 16 pgs.

"U.S. Appl. No. 11/211,037, Notice of Allowance mailed Apr. 27, 2009", 8 pgs.

"U.S. Appl. No. 11/211,037, Response filed Nov. 5, 2008 to Non-Final Office Action mailed Aug. 5, 2008", 11 pgs.

"Japanese Application Serial No. 2008-528133, Office Action mailed Feb. 8, 2011", 2 pgs.

* cited by examiner

FIG. 7 ary patent

TECHNIQUES FOR WATERMARKING AND DISTRIBUTING CONTENT

RELATED APPLICATIONS

The present application is a Continuation of and claims priority to U.S. application Ser. No. 11/211,037, filed on Aug. 23, 2005, now U.S. Pat. No. 7,570,641, and entitled: "Techniques for Watermarking and Distributing Content," the disclosure of which is incorporated by reference herein.

FIELD

The invention relates generally to content management and more specifically to watermarking and distributing content over a network.

BACKGROUND

The Internet and the World-Wide Web (WWW) are increasingly being used to distribute and sell content. For example, more and more content vendors are making movies, live sporting events, or news available to subscribers over the Internet. With the increase in network bandwidth and the rapid adoption of broadband and high-speed Internet access, even live television can be efficiently viewed and acquired via WWW browsers over the Internet.

With this new form of content delivery a host of problems are now being confronted by content vendors. One particular problem is piracy. The content of a provider generally enjoys copyright protection, but once the content is available to a legitimate licensee the content provider (licensor) cannot be assured that the licensee will not facilitate pirated versions of the content to the detriment of the licensor.

As result, content providers and content vendors have attempted to develop elaborate software and security techniques to ensure their content is not bootlegged. Yet, these very schemes are cumbersome, resource intensive, and make the content less attractive to even legitimate and honest licensees. Thus, content providers and vendors are in a catch 22 situation; provide the content in a flexible and user-friendly manner to sell it and live with some piracy or provide the content in a rigid and secure manner and forgo a lot of legitimate sales opportunities.

Another problem with content distribution is bandwidth, because even if a content provider sells content, the content is often distributed via servers operated by the content vendors. This means that if a particular content, such as a movie, is successful then distribution servers of the content vendor may get overwhelmed. As a result, buyers may become frustrated and sales may be lost. It is not the bandwidth of the buyer that is a problem; rather, it is the bandwidth overload of the content vendor that creates the bottleneck in content delivery.

Accordingly, improved techniques for protecting the intellectual property and delivery of content are needed.

SUMMARY

In various embodiments, techniques for watermarking and distributing content are presented. More specifically, and in an embodiment, a content watermarking and delivery system is provided. The content watermarking and delivery system includes a content delivery service and a watermarking service. The watermarking service is for generating a unique watermark sequence for a resource. The unique watermark sequence is associated with frames of content desired by the resource. The content delivery service is for developing and providing a delivery plan and for providing the unique watermark sequence to the resource over a network.

DETAILED DESCRIPTION

As used herein the terms "segment" and a "frame" may be used interchangeably. Content is divided into frames or segments, each frame receives a watermark. Assembled content includes a watermark sequence that repeats serially within the content. The length of the watermark sequence is configurable and can include a few watermarks in a predefined order or a large number of watermarks in a predefined order. "Content" may include multimedia, streams of live multimedia, graphics, images, presentations, video conferencing, audio, video, text, or various combinations of the same.

A "watermark" may be viewed as a subtle signal in a file (e.g., audio, video, image, text, etc.) that would not be detectable by a person, but could be detected by a machine. For example, in audio files the watermark may be an extra sound added for a short duration at a certain frequency. Anything that is subtle to a human and embedded in content, such that it is not easily removed may be considered a watermark.

In a sense, a watermark is a symbol represented by an alphabet. The alphabet is configurable and can include any symbol or element, such as, but not limited to characters, numerals, punctuation, symbols, unprintable characters, images, audio, etc. In some cases a single watermark may include more than one machine symbol. The watermark sequence may be viewed as a series of repeatable watermarks placed in a unique order to form a key.

Thus, the watermark is a mechanism for uniquely marking portions of content. Some example watermarks and usages can include, but are not limited to:

1) placing a hidden signal (spread spectrum watermark) in a segment of audio content (e.g., φ may represent something at 5,000 Hertz, χ may represent 5,100 Hertz, ψ 5,2000 Hertz, and so on), for example, a Moving Pictures Expert Group (MPEG) audio layer-3 (referred to as MP3) audio file with a spread-spectrum watermark in the file having a frame size of 2 seconds;
2) placing a hidden image in the lower bit of MPEG graphic data, for example, a movie file (MPEG) with a stegenographic image hidden in the video frame every 10 seconds;

3) placing an image in a movie (any format) to depict different images for different scenes, such as, for example, customized advertisements where different locations of different backgrounds depict custom advertisements within the movie (e.g., φ can represent a can of Pepsi® on a shelf, χ the can on a table, or ψ no can at all on a shelf or table);
4) placing the watermark in a text document to identify different punctuation in different locations of the text document depending upon identities of users, etc.;
5) placing the watermarks in software games with different stegenographic images (e.g., one frame per image file) in Joint Photographic Experts Group (JPEG) images of the came, the order of the files can define a serial sequence, the game may also have a combination of different types of watermarks;
6) placing the watermark in any kind of file format that has a metadata section such that different tags could be conditionally used in desired contexts; and
7) placing an image in a movie, television program or any video (any file format) to depict different images in different scenes, for example, the same cup in the background of a movie scene could be colored red representing the (alpha) watermark, or could be green representing the (beta) watermark, or blue representing the (gamma) watermark.

Thus, the watermark and the use of the watermark provide mechanisms for "marking" content in novel manners. The watermark may be simple or complex symbols in a format recognized by a machine. Furthermore, the use of the watermark or the purposes for placing watermarks in different portions of content may be used to conditionally effect how the content displays or is used. In this manner, the watermark's usage may be viewed as a mechanism to extend content within the native data format of the content.

It is understood that the above are just examples of types of watermarks and uses of the watermarks. Other types of watermarks and uses are possible and are intended to fall within the scope of this disclosure. Moreover, all these types of watermarks and uses are to be incorporated as implementation options in the descriptions that follow.

A "resource" is a service, an application, a system, a machine or device (e.g., a networked client machine or device, etc.), a user, an identity, a group of users, and the like. In various embodiments, a resource requests content. Each resource is associated and assigned a unique watermarked sequence version of the content for its consumption. Thus, any particular version of the content may be identified with a particular resource.

A "delivery plan" is a data in a normalized format, such as, but not limited to extensible markup language (XML), and the like. A delivery plan includes a path for a resource to acquire a watermarked sequence version of the content. For example, frames 1, 4, and 7 may be acquired from resource A; frames 2, 5, and 8 may be acquired from resource B; and frames 3, 6, and 9 may be acquired from resource C. Delivery plans may also include alternative delivery plans in the event that given deliveries plan fails to deliver a requesting resource its complete watermarked sequence version of the content. In most embodiments, a delivery plan includes one or more alternative or backup delivery plans. However, in some embodiments, only a single delivery plan may be used.

Various embodiments of this invention can be implemented within existing services associated with content delivery. Portions of the invention may be implemented within machines or servers that delivery content while other portions of the invention may be implemented as interfaces on the requesting resources. However, it is to be understood that the arrangements and architectures presented herein for watermarking content and delivering content are presented for purposes of illustration and that other arrangements are possible without departing from the teachings presented herein and below.

Figure 1:
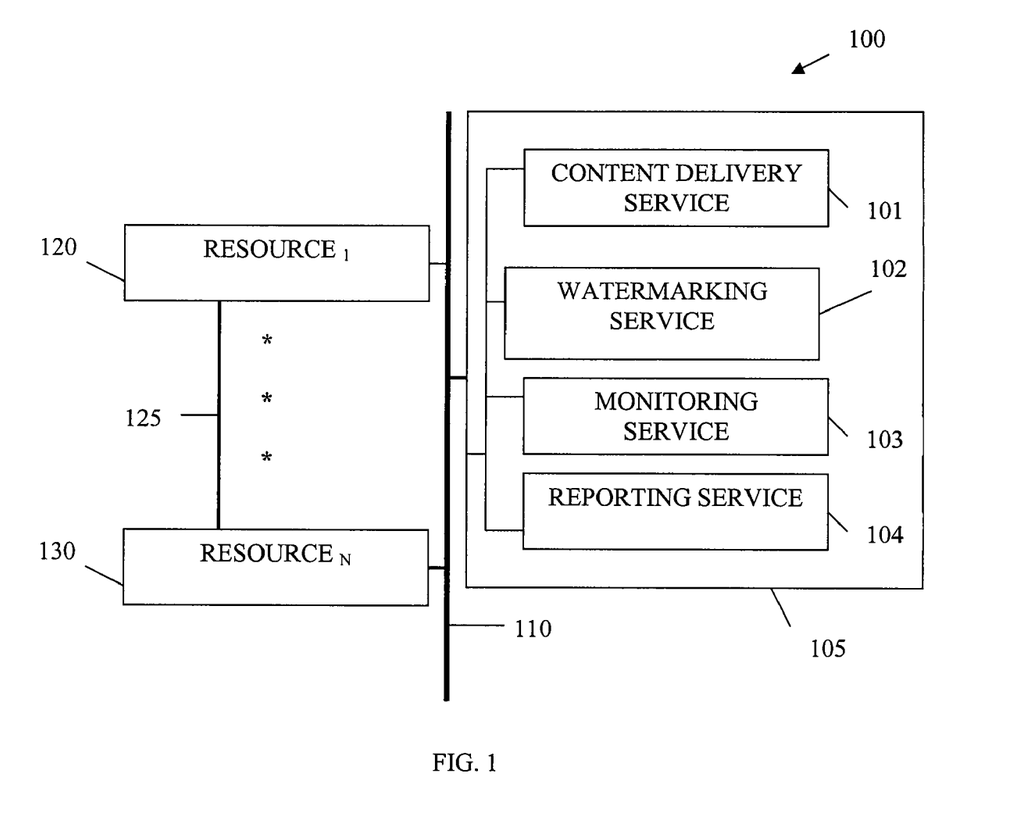
FIG. 1 is a diagram of a watermarking and delivery system, according to an example embodiment.

FIG. 1 is a diagram of a watermarking and delivery system 100, according to an example embodiment. The watermarking and delivery system 100 is implemented in a machine-accessible and readable medium and is operational over a network. The network may be a Local Area Network (LAN), a Wide Area Network (WAN), such as the Internet, or various combinations of the same. Moreover, the network may be wired, wireless, or a combination of wired and wireless.

In an embodiment, the watermarking and delivery system 100 is implemented within a local environment of a content vendor. Alternatively, the watermarking and delivery system 100 may be remotely accessible to a content vendor's environment over a network as a service to the content vendor. During operation, the watermarking and delivery system 100 provides novel watermarking and content delivery, which is discussed in greater detail below.

The watermarking and delivery system 100 includes a content deliver service 101 and a watermarking service 102. In some cases, the watermarking and delivery system 100 may also include a monitoring service 103 and/or a reporting service 104. The watermarking and delivery system 100 processes or is implemented within a machine or an environment 105 and is accessible over a network 110. Each of these will now be discussed in turn.

The content delivery service 101 is enabled to interact with the watermarking service for purposes of assembling unique watermarked sequence versions of content for requesting resources 120 and 130. Furthermore, the content delivery service 101 is enabled to develop delivery plans for requesting resources 120 and 130 to acquire desired content. In some embodiments, the content delivery service 101 may also develop one or more alternative delivery plans for the requesting resources 120 and 130.

It is also understood that although description provided here with FIG. 1 discusses the resources 120 and 130 as consuming resources, that this scenario need not always be the case. That is, in some embodiments, the resources 120 and 130 may also be content owners of the content being distributed that are interacting with the watermarking and delivery service 100 for purposes of watermarking their content. Thus, the resources 120 and 130 may be both consuming resources of the content or content owners.

The content delivery service 101 also provides the unique watermarked sequence versions of the content to the requesting resources 120 and 130 over the network 110. The content delivery service 101 also provides the watermark sequence associated with each requesting resource 120 or 130 over the network 110.

In an embodiment, the delivery plans developed by the delivery service 101 includes frame identifiers and identifiers for one or more other resources 120 and 130. A specific resource 120 or 130 acquires its unique watermark sequence and a delivery plan from the delivery service 101. The delivery plan instructs the specific resource 120 or 130 on where to acquire frames of the desired content. In some cases, the specific resource 120 or 130 acquires some frames from the content delivery service 101 while other ones of the frames are acquired, according to the delivery plan, from other resources 120 or 130 via a peer-to-peer (P2P) network connection 125.

It is noted that the delivery plan may instruct a specific requesting resource 120 or 130 to acquire each frame of desired content from the content delivery service 101, may instruct the specific resource 120 or 130 to acquire each frame from a single different resource 120 or 130 via P2P networks 125, may instruct the specific resource 120 or 130 to acquire some frames via a P2P network 125 from one resource 120 or 130 and other ones of the frames via a P2P network 125 from one or more other resources 120 or 130, or may instruct the specific resource 120 or 130 to acquire some frames from the content delivery service 101 and other frames from one or more other resources 120 or 130.

It is appreciated that the content delivery plan developed by the delivery service 101 assist in alleviate the bandwidth associated with the machine 105 that processes the watermarking and delivery system 100. That is, if a particular content, such as a new release of a movie, becomes hugely popular, then the bandwidth load may be offloaded by the content delivery service 101 to other resources 120 or 130 that have already acquired the content via the delivery plan. To entice resources 120 or 130 to participate or permit other resources 120 or 130 to acquire portions or frames of the content, the watermarking and delivery system 100 may include a loyalty or rewards service to give credits or loyalty points to participating resources 120 or 130. In this manner, resources 120 or 130 can be enticed to participate in offloading the bandwidth associated with the machine 105 of the watermarking and delivery system 100 for purposes of delivery portions of the content to other new requesting resources 120 or 130.

The watermarking service 102 is enabled to generate a unique watermark sequence (herein after also referred to as watermark key or key) for frames of desired content for each unique resource 120 or 130 that requests the desired content. In an embodiment, the watermarking service 102 maintains an alphabet of watermarks or a set of available symbols for watermarks, such that each frame of desired content is replicated and associated with each available symbol or watermark. An example of such an arrangement, which is managed by the watermarking service 102, is shown in FIG. 2.

Figure 2:
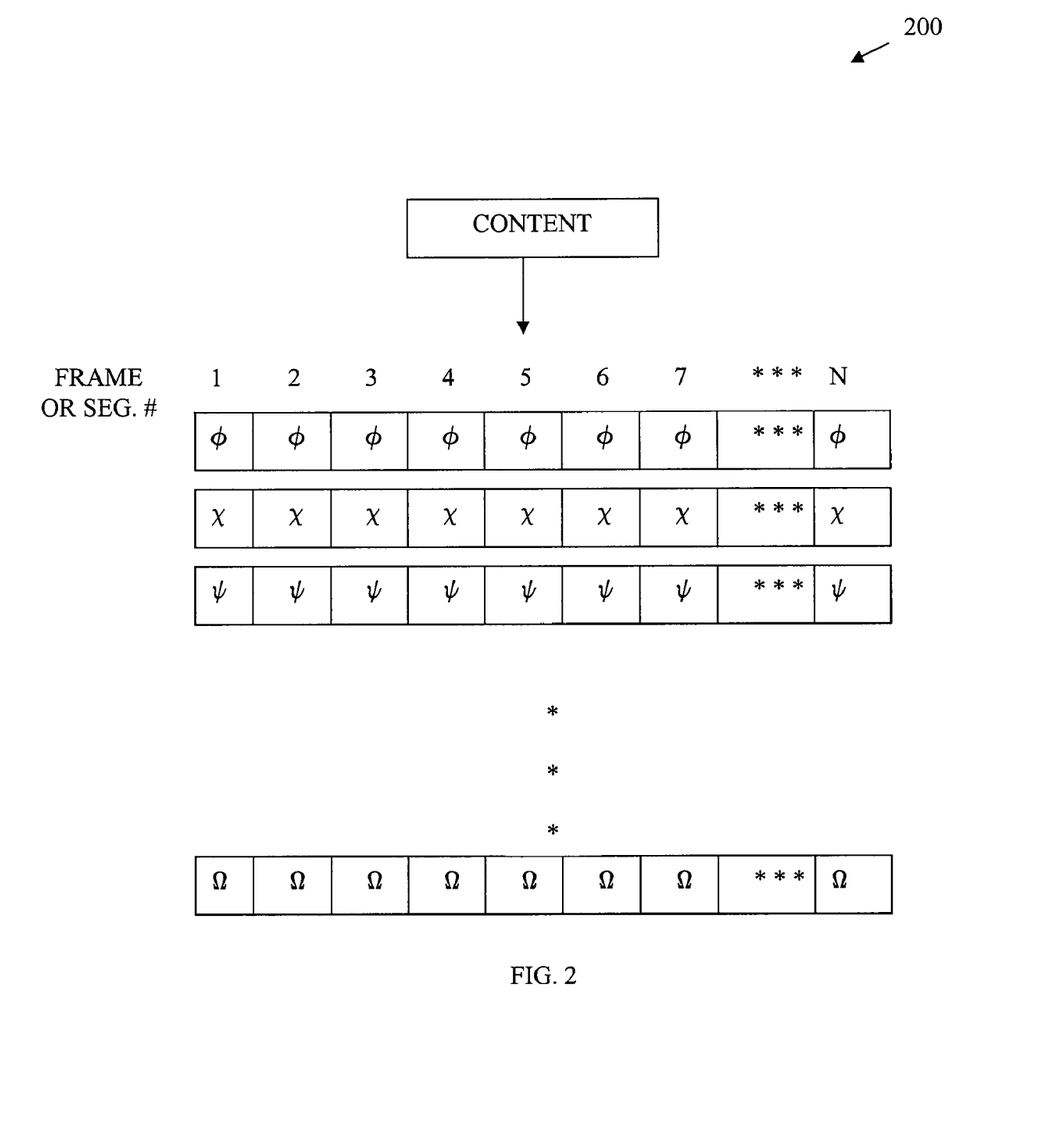
FIG. 2 is a diagram of example watermarked content, according to an example embodiment.

FIG. 2 is a diagram 200 of example watermarked content, according to an example embodiment. In the diagram 200 it is illustrated that a particular version of content is maintained as N copies, where N is an Integer number greater than 1 and extends to the number of unique watermarks, elements, or symbols associated with the alphabet or set of available symbols managed by the watermarking service 102.

Each replicated version of the content in the diagram 200 includes all frames or segments associated with the content and includes a single additional watermark. The watermarking service 102 uses this arrangement and knowledge about assigned watermark sequences to construct and delivery unique watermark sequences or keys for each unique requesting resource 120 or 130. An example watermark sequence version of content is shown in FIG. 3.

Figure 3:
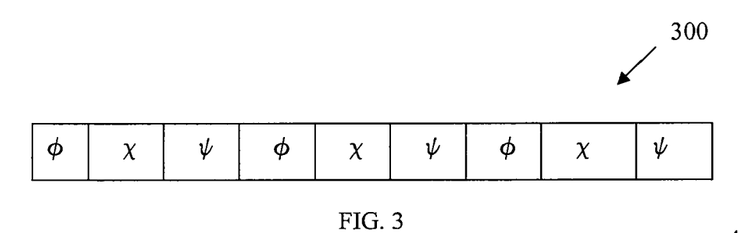
FIG. 3 is a diagram of an example resource's watermarked content having a unique watermark sequence specific to that resource, according to an example embodiment.

FIG. 3 is a diagram 300 of an example resource's watermarked content having a unique watermark sequence (key) specific to that resource, according to an example embodiment. The diagram 300 depicts example content that includes 9 frames, each frame includes a watermark, and the content includes a watermark sequence having a watermark sequence length of 3. The watermark sequence is "ϕχψ." In the example, content it is also seen that the watermark sequence (ϕχψ) is repeated for three successive iterations, such that the length of the content is 9 frames. Thus, the key or unique watermark sequence may be also viewed as having a length of 9 for a 9 segment or frame version of the content. That is, the key loops throughout the content for each frame or segment and the result is a key having a length of 9: "ϕχψ ϕχψ ϕχψ."

The watermarking service 102 manages the length of watermark sequences, manages delivering a unique watermark sequence for each unique resource 120 or 130, manages associating a unique watermark sequence with each unique resource 120 or 130, and manages the alphabet or set of available symbols for the watermarks and watermarks or symbols associated with the watermark sequences or keys.

As was described above in detail, the content delivery service 101 and the watermarking service 102 cooperate with one another to delivery unique watermark sequences (keys) and content delivery plans to requesting resources 120 and 130. The resources 120 or 130 use the delivery plans to acquire desired content. The content can be acquired in a variety of manners, but each complete version of the desired content has to conform to the defined watermark sequence (key) that is associated with a particular resource 120 or 130. To ensure that this is the case, the resources 120 or 130 implement one or more interfaces that interact with the watermarking and delivery system 100, without these interfaces the resources 120 or 130 are unable to acquire the desired content.

A few example scenarios of how a requesting resource 120 or 130 uses a delivery plan to acquire desired content in accordance with its unique watermark sequence (key) will now be discussed in FIGS. 4 and 5. It is noted that a variety of other scenarios are possible and are intended to fall within the scope of the embodiments presented herein. The other optional components of the watermarking and delivery system 100 will be discussed after these example scenarios are described.

Figure 4:
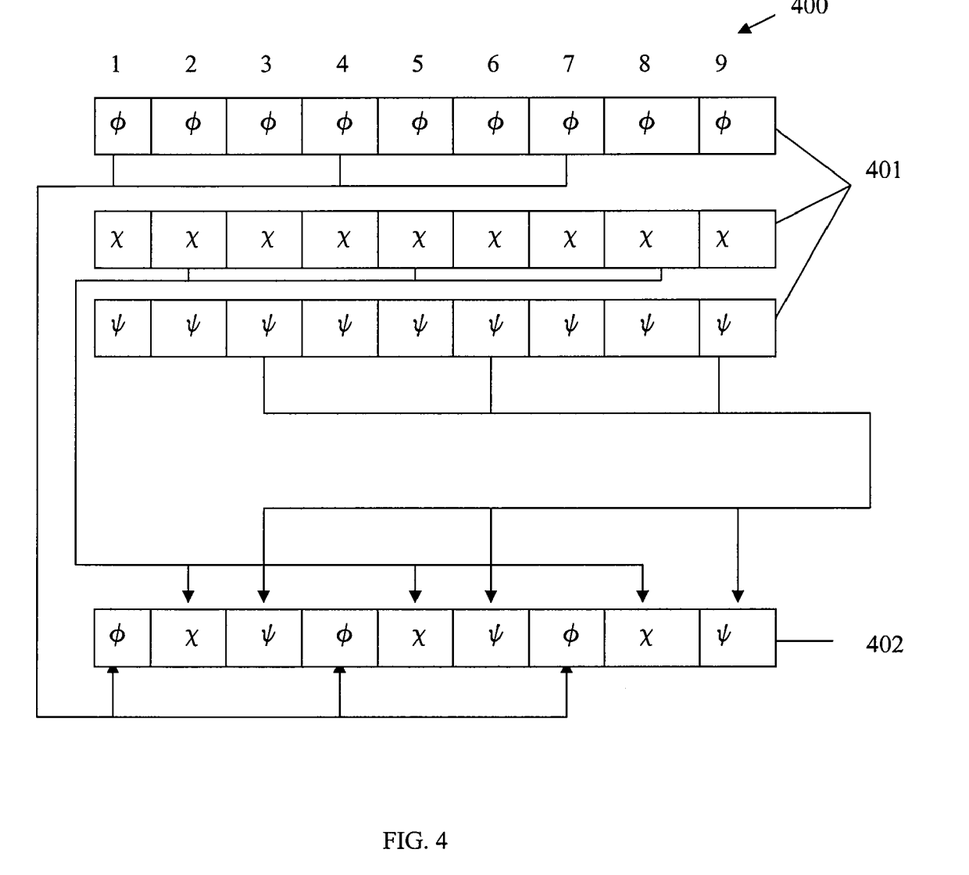
FIG. 4 is a diagram of an example resource's watermarked content having a unique watermark sequence acquired from the watermarking and delivery system of FIG. 1, according to an example embodiment.

FIG. 4 is a diagram 400 of an example resource's watermarked content having a unique watermark sequence or key acquired from the watermarking and delivery system 100 of FIG. 1, according to an example embodiment. In this example scenario a requesting resource 120 or 130 acquires a complete copy of desired content directly from the watermarking and delivery system 100.

It can be seen in the example scenario of FIG. 4, that the content is replicated into multiple versions 401, such that each version includes all frames of the content and each version has a single watermark, element, or symbol of the alphabet or of the set of available symbols. The content is 9 frames in length.

The requesting resource 120 or 130 of the example scenario has a unique watermark sequence (key) assigned by the watermarking service 102 of "ϕχψ." The version of the content 402 acquired by the requesting resource 120 or 130 includes 9 frames. Frames 1, 4, and 7 are acquired with the watermark or symbol of "ϕ." Frames 2, 5, and 8 are acquired with the watermark or symbol of "χ." Frames 3, 6, and 9 are acquired with the watermark or symbol of "ψ." The watermark sequence length is 3 (ϕχψ is three symbols in length), and the watermark sequence (key) is repeated serially for three iterations. With the example scenario presented in FIG. 4, the content delivery plan developed by the content delivery service 101 instructed the requesting resource 120 or 130 to acquire all frames of the content 402 directly from the watermarking and delivery system 100. A different scenario is presented in FIG. 5.

Figure 5:
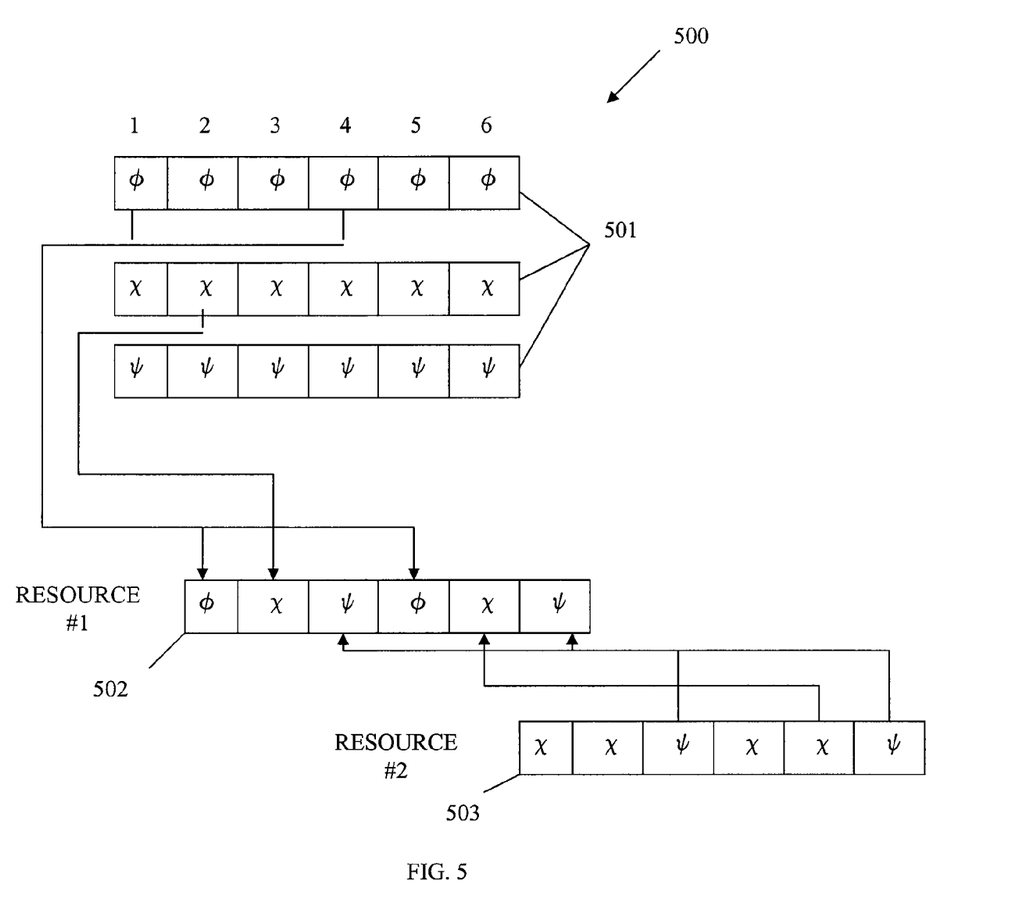
FIG. 5 is a diagram of an example resource's watermarked content having a unique watermark sequence acquired from the watermarking and delivery system of FIG. 1 and acquired partially from another resource, according to an example embodiment.

FIG. 5 is a diagram 500 of an example resource's watermarked content having a unique watermark sequence or key acquired from the watermarking and delivery system of FIG. 1 and acquired partially from another resource, according to an example embodiment. In the example scenario of FIG. 5, the resource #1 is the requesting resource 120 or 130 that desires content from the watermarking and delivery system 100. However, unlike the scenario presented in FIG. 4, in FIG. 5 the resource #1 acquires a delivery plan from the content delivery service 101 that instructs the resource #1 to acquire some frames from the watermarking and delivery system 100 and other frames from another resource #2.

Again, the content 501 is replicated in the watermarking and delivery system 100 with three watermarks φ, χ, and ψ. In the scenario presented in FIG. 5, the content is represented by 6 frames. Resource #1 has a unique watermark sequence or key of "φχψ." This produces a version of the content 502 for the resource #1 that has 6 total frames with the unique watermark sequence or key (φχψ) repeated twice within the resource #1's version of the content 502.

In the scenario of FIG. 5, resource #2 also has a version of the content 503. Resource #2's unique watermark sequence or sequence is "χχψ." The delivery plan developed by the delivery service 101 instructs resource #1 to acquire frames 1, 2, and 4 of its version of the content 502 from the watermarking and delivery system 100 while frames 3, 5, and 6 are acquired from resource #2 in a P2P fashion or network 125.

As was mentioned other scenarios are possible. For example, multiple resources 120 or 130 may provide different frames of the content to a requesting resource 120 or 130. Moreover, the watermarking and delivery system 100 may not provide any frame of the content to a requesting resource 120 or 130. All scenarios are intended to fall within the scope of the embodiments presented herein.

It should also be noted that although it has been mentioned that content is replicated into multiple versions within the environment 105 of the watermarking and delivery system 100, this does not have to be the case. The watermark assignment may be dynamically determined and assigned from a single version of the content by the content delivery service 101. In other words, a single version of the content includes no watermark at all, and the content delivery service knows which watermark to assign to which frame of the content based on the identity of the requesting resource 120 or 130, its unique watermark sequence or key, and its developed delivery plan. Embodiments such as this may save storage and/or memory within the environment 105 of the watermarking and delivery system 100 and may permit larger watermark sequence lengths and/or larger alphabets or sets of available symbols associated with the watermark sequences (keys) without impacting storage or memory.

Now continuing with the watermarking and delivery system 100 of FIG. 1. In an embodiment, the watermarking and delivery system 100 may optionally include a monitoring service 103. The monitoring service 103 may monitor or mine the network 110 for versions of any distributed content. The monitoring or mining process may look for a specific watermark sequence or key assigned to a specific resource 120 or 130. If multiple copies are found that violate a license associated with the resource 120 or 130, then a variety of actions may take place.

For example, the monitoring service 103 may alert the content delivery service 101 to restrict future access for a violating resource 120 or 130 to the watermarking and delivery system 100. Alternatively, the monitoring service 103 may alert the watermarking service 102 to create a special watermark sequence or key having infrequently used watermarks present in that sequence for any subsequent transaction performed with the violating resource 120 or 130. This may permit the violating resource 120 or 130 and its subsequent activities with respect to subsequent acquired content to be more easily monitored and permit more evidence to be gathered about the violating resource 120 or 130.

In other embodiments, the monitoring service 103 may monitor or mine the network 110 for versions of the content that do not include an assigned or known watermark sequence. This may occur when multiple resources 120 or 130 cooperate to create unique watermark sequences or keys not distributed or known to the watermarking and delivery system 100. In such a situation, the watermarks that are present in such a version of the content are known to be associated with a limited number of resources 120 or 130. Thus, a set of resources 120 or 130 may be identified as potential violators of licenses associated with the content. Moreover, this can be reduced further because a specific resource 120 or 130 may have a certain watermark that is always associated with a given frame number. For example, Allan always has an φ watermark in positions 3, 6, 9, etc., while Joe always has a χ watermark in positions 1, 4, and 7. The identified resources 120 or 130 that conform to these conditions may then be assigned unique watermarks or symbols similar to what was discussed above and monitored more closely for future transactions.

In can be seen that a monitoring service 103 may use knowledge about the unique watermark sequences or unique keys to monitor and to audit the network 110 for pirated versions of the content. Once violating situations can be confirmed, the monitoring service 103 may interact with the content delivery service 101 and/or the watermarking service 102 to actually control future delivery of content to violators. This improves the protection of intellectual property for content providers and vendors and provides them assurances and controls for their content.

In another embodiment, the watermarking and delivery system 100 may also include a reporting service 104. The reporting service 104 may be used to report versions of the content present on the network 110 that are not known to be registered. The reporting may be automated and communicated to the monitoring service 103 for further investigation or handling or the reporting may be communicated via electronic communications or reports to content providers or vendors.

It has now been demonstrated how content may be uniquely watermarked or keyed and delivered over networks. The techniques presented improve bandwidth associated with content providers and vendors and provides controls for protecting licenses associated with content. Moreover, the techniques present mechanisms for identifying resources associated with versions of the content.

Figure 6:
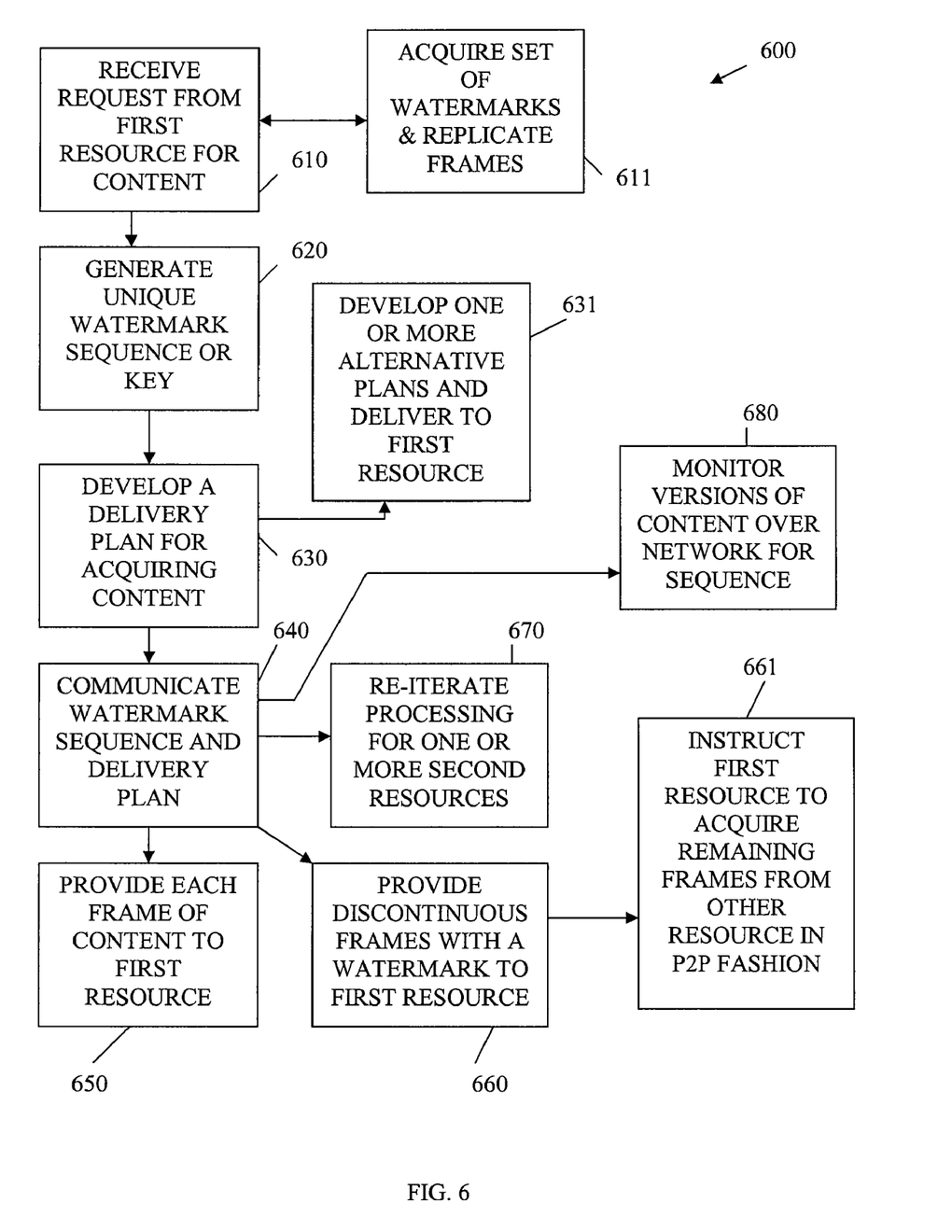
FIG. 6 is a diagram of a method for watermarking and distributing content, according to an example embodiment.

FIG. 6 is a diagram of a method 600 for watermarking and distributing content, according to an example embodiment. The method 600 (hereinafter "delivery service") is implemented in a machine-accessible and computer-readable medium and is operational over a network. The network may be wired, wireless, or a combination of wired and wireless. In an embodiment, the delivery service may be implemented in the watermarking and delivery system 100 of FIG. 1.

The delivery service is implemented within a content provider or content vendor's environment over a network. Alternatively, the delivery service is implemented as a remote service that securely interacts in a trusted manner with a content provider or content vendor. Resources include interfaces to interact with the delivery service. In some cases, these interfaces are embedded as applets on WWW pages, such that the interfaces do not actually reside within the direct environment of the resources.

At 610, the delivery service receives a request from a first resource for desired content. In an embodiment, at 611, the delivery service may have previously acquired an alphabet of watermarks or set of available symbols for watermarks and watermark sequences or keys having predefined and configurable lengths. The content may have been broken into frames and each watermark or element of the alphabet or symbol associated with set of available symbols associated with a different replicated version of the content. This technique or arrangement was discussed above with respect to FIG. 2. In an alternative embodiment, the content is not replicated and watermarks for frames are dynamically assigned or assigned in real time to assemble unique watermark sequences or to develop delivery plans for resources.

At 620, the delivery service generates a unique watermark sequence or unique key for the first resource. Again, the watermark sequence or key includes a predefined length and is repeated serially within versions of the content that is acquired by the first resource, such that the first resource's version of the content includes a repeating watermark sequence or repeating key for frames of the version and that repeating watermark sequence or repeating key is unique to the first resource.

At 630, the delivery service develops a content delivery plan for the first resource to acquire the desired content that was requested by the first resource. The delivery plan may instruct the first resource to acquire all of the frames of the desired content from the delivery service, some of the frames from the delivery service, all of the frames from one or more other second resource, or some of the frames from the delivery service and some other ones of the frames from one or more second resources. Some example scenarios associated with how this works was described above with respect to FIGS. 4 and 5.

In an embodiment, at 631, the delivery service may also develop one or more alternative delivery plans for the first resource. This is useful in the event that a particular delivery plan fails or becomes too slow. Thus, the first resource may be provided a plurality of delivery plans; if one fails another plan may be automatically picked up with the next frame needed from one of the alternative plans. Alternatively, if a plan fails altogether an alternative plan may be processed by the first resource to acquire the desired content.

At 640, the delivery service communicates the watermark sequence or key and delivery plan for acquiring the desired content to the first resource over a network. In some cases, at 650, this may mean that each frame of the desired content is directly acquired from the delivery service. In other cases, at 660, some discontinuous frames may be directly acquired from the delivery service while, at 661, the delivery plan instructs the first resource to acquire remaining frames of the desired content from one or more other resources that have versions of the content in a P2P fashion or over P2P networks.

In an embodiment, at 680, the delivery service may re-iterate the processing for one or more second resources. That is, the delivery service is enabled to continually re-distribute unique watermark sequences or unique keys and delivery plans to multiple requesting resources over the network. The bandwidth of the machine or device that processes the delivery service can be controlled and balanced by communicating delivery plans that permit the resources to acquire frames of the content from one another rather than directly from the delivery service.

According to an embodiment, at 680, the delivery service may also regularly or periodically monitor versions of the content over the network for unique watermark sequences or unique keys associated with specific resources or for versions of the content that have unknown or undistributed watermark sequences or keys. Techniques for performing this monitoring and/or reporting were discussed above with respect to the watermarking and delivery service 100 of FIG. 1.

Figure 7:
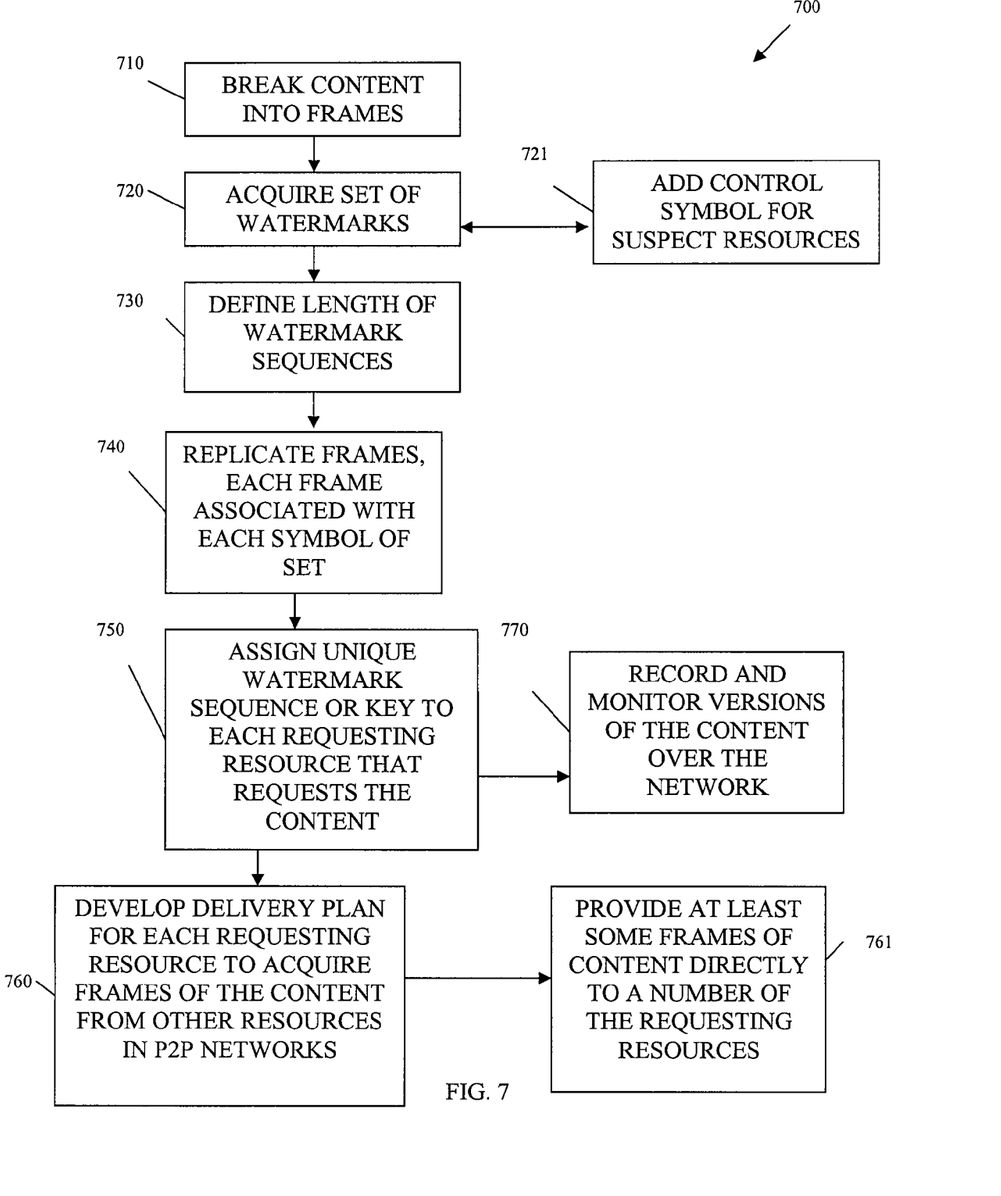
FIG. 7 is a diagram of another method for watermarking and distributing content, according to an example embodiment.

FIG. 7 is a diagram of another method 700 for watermarking and distributing content, according to an example embodiment. The method 700 is implemented as instructions in a machine-accessible and readable medium. The instructions when loaded and processed by a machine perform the processing depicted in FIG. 7.

The instructions may be uploaded to a machine from removable medium and processed. Alternatively, the instructions may be downloaded from one machine over a network to another machine and processed. Still further, the instructions may come bundled or preloaded within a machine. In yet another situation, the instructions may be processed on one machine over a network at the direction of a different machine of the network.

The instructions provide a more detailed description of how content may be organized, watermarked, and distributed via delivery plans than what was presented in the method 600 of FIG. 6. Although some processing of the instructions overlap with the method 600 of FIG. 6 and in such situations, the processing of the instructions are intended to provide an alternative view to what was presented with the method 600 of FIG. 6.

Initially, at 710, the instructions organize content that is to be uniquely watermarked and distributed over a network to resources by breaking the content into a plurality of segments or frames. The number of frames or segments is configurable and may be provided as runtime parameters to the instructions or as metadata associated with the content. Alternatively, the number of frames may be defined by the content itself based on the native data format of the content or the compressed format of the content.

At 720, the instructions acquire an alphabet of watermarks or set of available symbols associated with watermarks. The alphabet or set of available symbols may also be a runtime parameter or metadata provided to the instructions. In such situations, the actual elements, symbols, or watermarks associated with the alphabet or set of available symbols may be readily determined, such as "$\Lambda \ldots \Omega$," or may be custom developed. When the alphabet or set of available symbols is custom developed, the watermarks of the alphabet or set may be acquired via a file identifier or memory structure that includes the watermarks, symbols, or elements of the alphabet or symbol set. In fact, any alphabet or symbol set may be used as long as the alphabet or symbol set is persistent and communicated to the instructions or configured within the instructions.

In an embodiment, at 721, some symbols, elements, or watermarks of the alphabet or symbol set may be reserved as control elements. That is, control symbols, elements, or watermarks are used infrequently and used to detect when suspicious behavior is occurring with content previously distributed. The control elements or symbols are doled out to trap or identify a violating resource by assigning the control elements or symbols to future versions of content that may be given to a suspicious resource or set of resources. In some cases, the control elements or symbols may pre-exist within the alphabet or symbol set and is reserved for control uses. In other cases, the control elements or symbols may be dynamically added to the alphabet or symbol set to dynamically expand the alphabet or symbol set on an as needed basis.

At 730, the instructions define a length for watermark sequences or keys. Again, the length may be preconfigured with the instructions or may be acquired as runtime parameters or as metadata. Moreover, some content may have a different watermark sequence or different key than other content. That is, the length of a watermark sequence or key may be associated with a specific type of content.

At 740, the instructions replicate frames of the content, such that each replicated version of the content is associated with a single element, symbol, or watermark of the alphabet or symbol set. An example of this was presented and described above with respect to FIG. 2. It is also noted that the replication need not always occur, since the assignment of watermarks to frames may be dynamically assigned.

Once the content is organized and the instructions know the alphabet or symbol set and the watermark sequence length or key length, the instructions are ready to service requesting resources that desire the content. Accordingly, at 750, the instructions assign a unique watermark sequence or unique key to each unique requesting resource that desired or request the content. This permits the instructions to keep track of versions of the content and to know which resource has a particular version.

In an embodiment, at 760, the instructions develop delivery plans for each requesting resource to acquire the content from other resources that have already acquired versions of the content via P2P networks. In some cases, at 761, the delivery plan may also permit the requesting resources to acquire at least some of the frames of the content directly from the instructions. In some embodiments, the instructions may develop and provide one or more backup or alternative delivery plans for acquiring versions of the content to each of the requesting resources. In still other embodiments, the delivery plan may instruct one or more of the requesting resources to acquire each of the frames for a version of the content from the instructions.

In yet another embodiment, at 770, the instructions may record the unique watermark sequences or unique keys and the identities of resources. This permits the instructions to actively monitor and audit the versions of the content that appear or are detected over the network. Techniques for monitoring and auditing the versions of the content were discussed above with the watermarking and delivery system 100 of FIG. 1 and with the method 600 of FIG. 6.

It has now been demonstrated how content may be uniquely watermarked and distribute by way of delivery plans over a network. This facilitates controls over the content and at the same time facilitates load balancing bandwidth associated with delivering the content by permitting authorized and encouraged P2P transactions for acquiring portions of the content. Moreover, the content does not have to be completely acquired from a single source. That is, the techniques encourage and facilitate acquiring portions of desired content from multiple sources; the portions when combined form a complete version of the desired content.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented system, comprising:
   a content delivery service implemented in a computer-readable medium and to execute on a machine; and
   a watermarking service implemented in a computer-readable medium and to execute on the machine;
   wherein the watermarking service is to generate a unique watermark sequence for a resource, the unique watermark sequence is a series of repeatable watermarks that form a key customized for the resource, each watermark in the unique watermark sequence assigned to a particular frame of content that includes multiple frames, the content delivery service is to develop and to provide a delivery plan to the resource and to provide the unique watermark sequence to the resource over a network, the delivery plan includes a path for the resource to acquire particular frames of the content from multiple different resources in order to reconstruct the unique watermark sequence, wherein the content delivery service is to provide an alternative delivery plan to the resource with the delivery plan in case the resource is unable to reconstruct the unique watermark sequence from the path provided with the delivery plan.

2. The system of claim 1, wherein the resource is to acquire the particular frames via peer-to-peer connections with each of the multiple different resources.

3. The system of claim 1, wherein the delivery plan includes unique frame identifiers for each of the particular frames and the delivery plan includes unique identifiers for each of the multiple different resources.

4. The system of claim 1, wherein the content delivery service is to construct the delivery plan to develop the delivery plan for purposes of managing bandwidth on the machine.

5. A computer-implemented system comprising:
   a content delivery service implemented in a computer-readable medium and to execute on a machine;
   a watermarking service implemented in a computer-readable medium and to execute on the machine;
   wherein the watermarking service is to generate a unique watermark sequence for a resource, the unique watermark sequence is a series of repeatable watermarks that form a key customized for the resource, each watermark in the unique watermark sequence assigned to a particular frame of content that includes multiple frames, the content delivery service is to develop and to provide a delivery plan to the resource and to provide the unique watermark sequence to the resource over a network, the delivery plan includes a path for the resource to acquire particular frames of the content from multiple different resources in order to reconstruct the unique watermark sequence; and
   a loyalty and reward service implemented in a computer readable medium and to execute on the machine, the loyalty and reward service is to provide loyalty points to the resource for accepting the delivery plan from the content delivery service.

6. The system of claim 1, wherein each watermark in the unique watermark sequence is a signal placed in a particular one of the frames for the content, the signal is not detectable by a person but is detectable by the machine or machines associated with the resource and the multiple different resources.

7. A computer-implemented method that executes on a server, the method comprising:

receiving, at the server, a request from a resource for content;

generating, by the server, a unique watermark sequence customized for the resource in response to a license for the content assigned to the resource, the unique watermark sequence forms a unique key comprised of a particular sequence of watermarks, each watermark associated with a different frame of the content, the content comprising multiple frames;

developing, by the server, a delivery plan for the resource to acquire the content, the delivery plan providing a communication path for the resource to reconstruct the unique watermark sequence by contacting different resources to obtain different ones of the frames for the content;

communicating, by the server, the unique watermark sequence and the delivery plan to the resource over a network; and providing, by the server, one or more alternative delivery plans to the resource, the one or more alternative delivery plans define other communication paths that use still other resources for the resource to contact when the different resources are unresponsive to the resource.

8. The method of claim 7 further comprising, customizing, by the server, a length of the watermark sequence in response to the license.

9. The method of claim 7, wherein receiving further includes managing the content as: multimedia, streams of live media, graphics, images, presentations, video conferencing data, audio, and/or video.

10. The method of claim 7, wherein generating further includes generating each watermark as one or more of the following: a hidden audio signal in the content, a hidden image in the content, alternative punctuation in the content, and/or alternative steganographic images in the content.

11. The method of claim 7, wherein developing further includes providing frame identifiers and resource identifiers in the communication path for the resource to reconstruct the unique watermark sequence.

12. A computer-implemented method that executes on a server, the method comprising:

receiving, at the server, a request from a resource for content;

generating, by the server, a unique watermark sequence customized for the resource in response to a license for the content assigned to the resource, the unique watermark sequence forms a unique key comprised of a particular sequence of watermarks, each watermark associated with a different frame of the content, the content comprising multiple frames;

developing, by the server, a delivery plan for the resource to acquire the content, the delivery plan providing a communication path for the resource to reconstruct the unique watermark sequence by contacting different resources to obtain different ones of the frames for the content;

communicating, by the server, the unique watermark sequence and the delivery plan to the resource over a network; and receiving, by the server and received from a reporting service on a machine of the resource, a report to confirm that the resource complied with the license by reconstructing the unique watermark sequence from the frames of the content and to confirm that the resource complies with usage restrictions of those frames on the machine of the resource.

13. The method of claim 12 further comprising, periodically, by the server, auditing the machine of the resource for compliance with the usage restrictions of the license.

14. A non-transitory computer-readable storage medium encoded with instructions thereon, the instructions executed by a computer configured to perform the method of:

breaking content into a plurality of frames;

acquiring a set of symbols for watermarks;

defining a length for watermark sequences;

replicating the plurality of frames, wherein each unique frame is replicated at least once for each symbol of the set of symbols;

assigning a unique watermark sequence having the length to each requesting resource, each unique watermark sequence customized to a particular requesting resource in response to a license for that particular requesting resource; and instructions for developing a different delivery plan for the content for each of the requesting resources to acquire the content, each delivery plan identifying different sets of other resources that each requesting resource is to interact with via peer-to-peer networks to acquire each requesting resource's unique watermark sequence.

15. The computer-readable storage medium of claim 14 further comprising instructions for providing credits or loyalty points to each of the particular requesting resources.

16. The computer-readable storage medium of claim 14, wherein developing further includes developing each different delivery plan in response to bandwidth considerations for the method and each of the other resources.

17. The computer-readable storage medium of claim 14 further comprising instructions for auditing each request resource's unique watermark sequence in view of each requesting resource's license over a network.

* * * * *